United States Patent [19]
Piggott

[11] 3,920,229
[45] Nov. 18, 1975

[54] APPARATUS FOR FEEDING POLYMERIC MATERIAL IN FLAKE FORM TO AN EXTRUDER

[75] Inventor: David C. Piggott, Burlington, Canada

[73] Assignee: PCL Industries Limited, Willowdale, Canada

[22] Filed: Oct. 15, 1974

[21] Appl. No.: 514,344

Related U.S. Application Data

[63] Continuation-in-part of Ser. No. 402,245, Oct. 1, 1973, abandoned.

[30] Foreign Application Priority Data
Oct. 10, 1972 Canada .............................. 153525

[52] U.S. Cl. .................. 259/192; 100/43; 425/145; 425/205
[51] Int. Cl.² ......................................... B29F 3/02
[58] Field of Search ........... 259/192, 191, 193, 5, 6, 259/21, 40, 41, 97, 9, 10, DIG. 41; 425/145, 148, 149, 207, 208, 205; 100/117, 147, 145, 146, 43

[56] References Cited
UNITED STATES PATENTS

| | | | |
|---|---|---|---|
| 2,887,719 | 5/1959 | Corbett | 259/191 |
| 2,943,012 | 6/1960 | Dunning | 100/117 |
| 3,261,056 | 7/1966 | Fritsch | 259/193 |
| 3,633,494 | 1/1972 | Schippers | 425/208 |
| 3,746,315 | 7/1973 | Rizzi | 259/192 |

*Primary Examiner*—Robert W. Jenkins
*Attorney, Agent, or Firm*—Hirons & Rogers

[57] ABSTRACT

Apparatus for feeding flake polymeric material to an extruder includes a storage container with an exit throat feeding a crammer device. The material is at all times subjected to mechanical action by vibrating the throat and at least the part of the storage container immediately adjacent the throat and agitating it in a skirt between the throat and the crammer. The crammer comprises a conical screw member with an annular passage of uniform radial dimension. The crammer motor is controlled in speed in accordance with a measurement of polymer pressure within the extruder, preferably at the transition portion of the extruder screw.

11 Claims, 2 Drawing Figures

– 1 –
APPARATUS FOR FEEDING POLYMERIC MATERIAL IN FLAKE FORM TO AN EXTRUDER

CROSS REFERENCE TO RELATED APPLICATIONS

This application is a continuation-in-part of my prior application Ser. No: 402,245 filed Oct. 1, 1973 which is now abandoned.

FIELD OF THE INVENTION

The present invention is concerned with apparatus for feeding polymeric material in flake form to an extruder therefor and for compressing such material to an increased density.

REVIEW OF THE PRIOR ART

The successful operation of a continuous extruder for polymeric material usually requires that the material be fed to the extruder at a relatively constant rate, usually by means of a motor-driven screw device referred to in the art as a crammer. Control of the feed of such materials has not been particularly successful hitherto, even when the feed material is in the usual hard, dense easily-metered pellet or bead form. Control of the feed is considerably more difficult when the polymeric material is in the so-called "flake" form produced by grinding scrap film, since its density can vary widely depending upon whether it is fully entrained in a large quantity of air, or has become compacted into a relatively dense mass, or varies in intrinsic thickness or density. Uniform feed of polymeric material is particularly important with an extruder used for the production of film, since the thickness of the film must be maintained within close, precise limits, and is very dependent upon such uniform feed.

DEFINITION OF THE INVENTION

It is an object of the present invention to provide a new apparatus for the controlled feeding of crammed polymeric material in "flake" form to an extruder.

It is another object to provide such apparatus able to feed an extruder with crammed polymeric material to the degree of constancy required for production of extruded film.

In accordance with the present invention there is provided apparatus for feeding flake polymeric material to an extruder and for cramming such material to an increased density, comprising:

a. a storage container for receiving the flake polymeric material and feeding the material therein to an exit throat, b. means vibrating at least the exit throat to facilitate feed of the flake material through the throat, c. a crammer device receiving the flake material from the throat and feeding it to the extruder, the crammer device comprising a conical screw member of decreasing radius in the direction of passage of material therethrough, and a casing enclosing the screw member, d. a crammer motor driving the screw member, and e. means controlling the speed of the said crammer motor to control the rate of feed of the crammed material to the extruder.

Preferably, the crammer device comprises the said conical screw member of decreasing radius and an immediately subsequent cylindrical screw member of approximately constant radius rotatable with the conical screw member.

Also in accordance with the invention there is provided apparatus for feeding flake polymeric material to an extruder and for compressing such material to an increased density, comprising:

a. a storage container for receiving the flake material and for feeding it to a crammer device, b. a crammer device receiving the flake material from the storage container and feeding it to the extruder, the crammer device including a rotatable screw member inside an enclosure therefor and a motor driving the crammer screw member, c. an extruder receiving the crammed polymeric material and feeding it in a flow path therein, d. a pressure detector measuring the pressure of the polymeric material at a point along the said flow path within the extruder and producing a signal in response thereto, and e. means controlling the motor in response to the said signal to maintain the measured pressure within predetermined limits.

Preferably the compression ratio of the crammer is between 1.3:1 and 3.0:1.

Preferably the point within the extruder at which the pressure of the polymeric material is measured is at the transition section of the extruder screw.

DESCRIPTION OF THE DRAWINGS

A specific embodiment of the invention will now be described, by way of example, with reference to the accompanying diagrammatic drawings wherein.

DESCRIPTION OF THE PREFERRED EMBODIMENT

Figure 1:
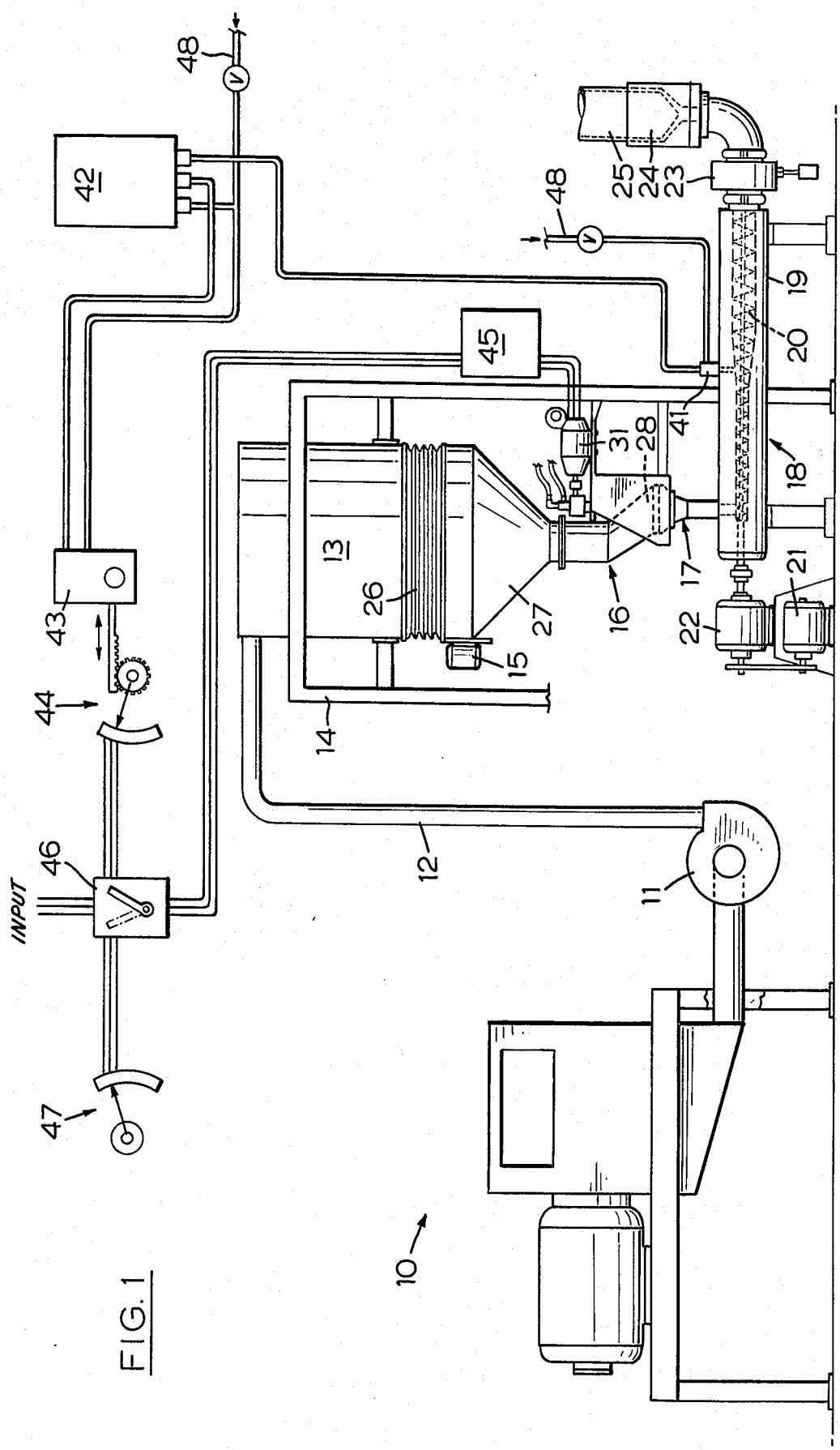
FIG. 1 is a general view of the apparatus, and showing also the control apparatus therefor.

In this preferred embodiment scrap plastic film is fed by hand into a fly-knife rotary grinder 10, the resulting "flake" material being sucked therefrom by a fan 11 via a pipe 12 and blown to the top of a vertical storage bin 13. The bin is mounted in a frame 14 with its lower end arranged for vibration by means of a vibrator unit 15 attached thereto, the bin feeding the flake material via a throat 16 to an auger unit 17 mounted on the casing of an extruder 18. The extruder comprises an outer casing 19 having an elongated feed screw 20 mounted in a corresponding chamber and driven by a motor 21 via a speed reduction gear 22. The body of the extruder is heated by means not shown and the plastic flake material is heated and mixed during its passage along the screw to emerge from the high pressure discharge end as a hot, uniform, viscous, liquid flowable mass. The mass passes through a filter unit 23 to a die 24 in which it is formed into a tube 25. The filter unit may be of the type disclosed in my U.S. Pat. Ser. No. 3,817,377, the disclosure of which is incorporated herein by reference. The further handling of the output of the extruder is not essential to the operation or understanding of the present and will be apparent to those skilled in the art.

Figure 2:
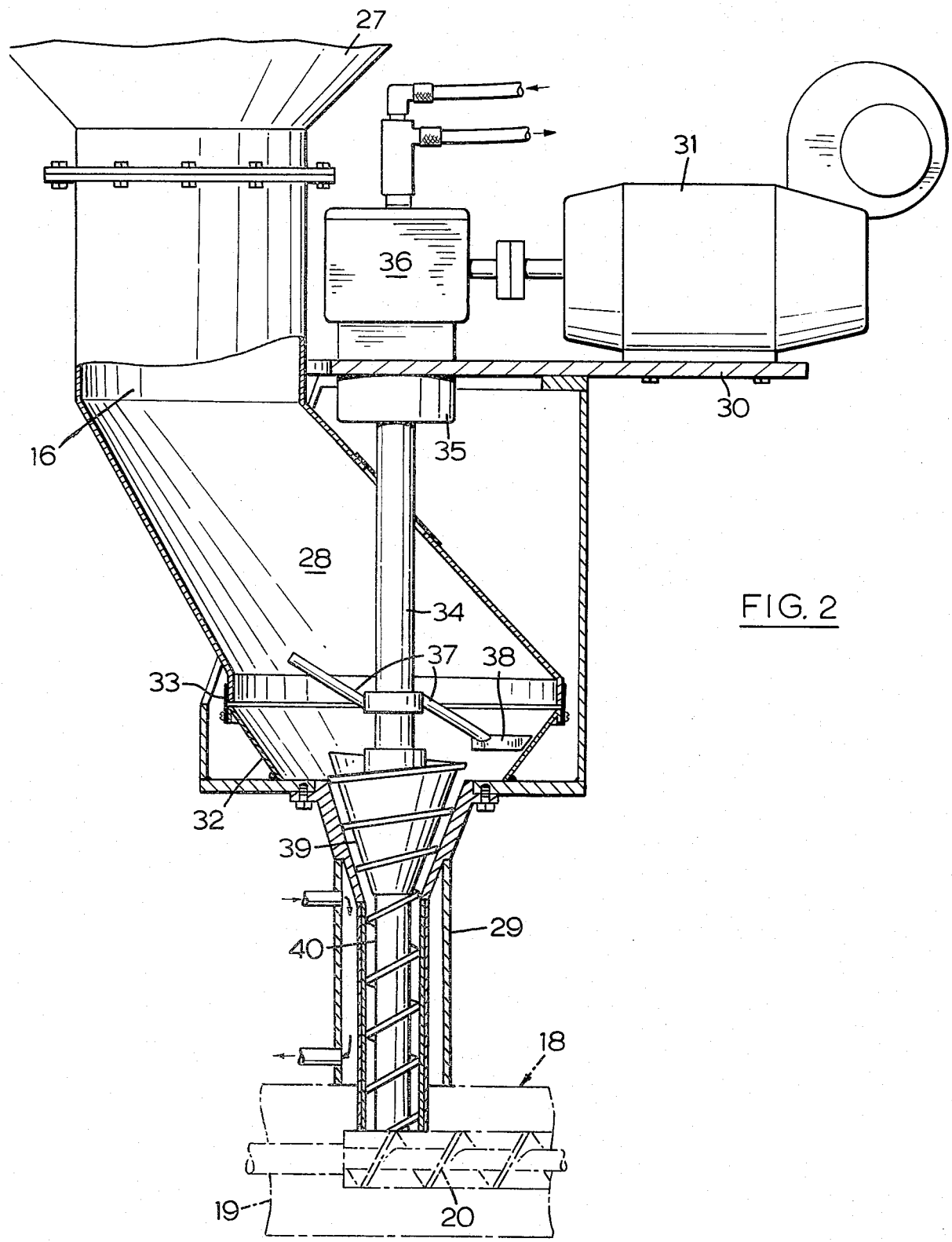
FIG. 2 shows the detail of a crammer section of the apparatus of FIG. 1, drawn to a larger scale and with parts broken away as necessary to show the interior of the apparatus.

The upper part of the bin 13 is mounted rigidly to the support frame 14 and is connected to the bottom part 27 by a resilient connection 26 that permits vibration thereof relative to the upper part. The bottom part 27 of the bin decreases progressively in cross-sectional area to the throat 16, which extends vertically and is of constant cross-sectional area along its length. The throat feeds into an apron 28 of increasing cross-sectional area, which is connected to the throat 16 and vibrates therewith. Referring now especially to FIG. 2, the crammer housing 29 and the mounting 30 for drive motor 31 are rigid with one another and with the extruder casing, so that they are stationary. A stationary funnel-shaped receiver 32 for the crammer is fixed to the crammer casing and connected to the vibrating apron 28 by a resilient cylinder 33 to permit relative movement between them without escape of the flake material.

The crammer screw comprises a vertical shaft 34 mounted in a thrust-bearing 35 and driven by the motor 31 via a right-angle speed reducing drive 36, which also supports the shaft. A pair of arms 37 extend oppositely, upwardly and downwardly and radially outward from the shaft, and upon rotation of the shaft agitate the flake material in the funnel and ensure that it cannot "bridge" or otherwise jam in its downward passage. One of the arms is provided at its end with a paddle blade 38 to facilitate the agitating action.

The crammer screw also comprises a conical member 39 joined at its bottom end to an elongated cylindrical member 40, the two members being coaxial with one another and with the shaft. The body extends through a corresponding chamber in the crammer housing with substantially constant spacing between the body outer surface and the chamber inner surface, and a helical blade fixed to the body outer surface extends in the annular passage thus formed to convey the flake material and compress or cram it to the extent required for proper feeding of the extruder. It will be seen that cramming action takes place only in the part of the passage between the member 39 and the corresponding part of the housing and the compression ratio obtained is arranged to be between 1.3 and 3.0:1, preferably 1.5/1. The shaft 34 and the part of the housing 29 around the member 40 are water cooled.

In the production of film from an extruder it is essential that the liquid polymer mass issue from the die 24 at a uniform flow rate e.g. ±5% and the crammer should therefore be operated to feed the flake material as uniformly as possible to the extruder. To this end a pressure detector 41 is mounted on the extruder casing at a location about one-quarter to one half along its length, and is arranged to respond to the pressure of the polymer at this point. The location of this detector should be within the transition section of the extruder screw in which the polymer metered by the preceding section is compressed and mechanically worked. The output from the detector is fed to a controller 42, which in turn controls a pilot relay 43 operating a motor speed rheostat 44. The setting of the rheostat controls a motor controller 45 through a two-way switch 46, the controller controlling the speed of the motor 31, which preferably is of Direct Current, Variable Speed type. If necessary the automatically controlled rheostat may be replaced by operation of the switch 46 with a manually-controlled rheostat 47. The detector 41, controller 42 and relay 43 are all of airoperated type and are fed with operating air via pipes 48.

In a particular embodiment the detector 4 measures within the range 0 – 5,000 p.s.i. and usually operates in the range 1500 – 2000 p.s.i. As the pressure increases the speed of the motor is reduced by the controller and vice versa. The extent of the change of motor speed with change of pressure as measured by the detector is adjustable within the controller to obtain the desired response. The specific embodiment described employing pneumatic controls makes use of a Taylor Instrument Co. Controller Model 444RF for this purpose.

In operation scrap plastic material, usually in the form of film, is fed into the grinder where it is broken into flake form. The flakes are sucked into the fan and then blown therefrom entrained in large quantities of air to the interior of the bin 13, sinking to the bottom thereof. The rotating arms 37 prevent the material bridging or blocking but permit it to feed into the mouth of the auger which compacts it, and to some extent pre-heats it, for supply to the extruder at a density necessary for smooth and proper operation thereof.

During the whole of its path in the apparatus the plastic material is subjected to a positive mechanical action, either from the fan and the operating air, the vibrating unit comprising the bin 13, throat 16 and apron 28, the paddle arms 37, the crammer screw and the extruder screw, so that it cannot jam or bridge in any part of the apparatus.

Control of the crammer motor speed in response to the pressure of the plastic material in the extruder is found to be unexpectedly positive and accurate in obtaining uniform feed of the material, requiring only a simple control of the motor. The motor control is provided in known manner with a control circuit for limiting the torque output of the motor in the event of overload, e.g. when the crammer screw engages an unexpectedly dense quantity of the flake material.

I claim:

1. Apparatus for feeding flake polymeric material to an extruder and for compressing such material to an increased density, comprising:
   a. a storage container for receiving the flake polymeric material and feeding the material therein to an exit throat,
   b. means vibrating at least the exit throat to facilitate feed of the flake material through the throat,
   c. a crammer device receiving the flake material from the throat and feeding it to the extruder, the crammer device comprising a conical screw member of decreasing radius in the direction of passage of material therethrough, and a casing enclosing the screw member,
   d. a crammer motor driving the screw member, and
   e. means controlling the speed of the said crammer motor to control the rate of feed of the crammed material to the extruder.

2. Apparatus as claimed in claim 1, wherein the crammer device comprises the said conical screw member of decreasing radius and an immediately subsequent cylindrical screw member of approximately constant radius rotatable with the conical screw member.

3. Apparatus as claimed in claim 1, wherein the said vibrating means vibrate at least the part of the storage container immediately adjacent the exit throat.

4. Apparatus as claimed in claim 1, including an apron between the throat and the crammer device, and stirrer arms rotatable with the crammer screw member to agitate the flake material in the apron and facilitate its feed to the crammer device.

5. Apparatus as claimed in claim 1, wherein the said conical screw member comprises a conical body forming between its outer face and the corresponding face of the enclosing casing an annular passage of constant radial dimension and carrying a screw blade on its outer face to feed material through the annular passage and to thereby compress it to the increased density.

6. Apparatus as claimed in claim 1, wherein the compression ratio of the crammer is between 1.3:1 and 3.0:1.

7. Apparatus as claimed in claim 1, wherein the motor speed is controlled in accordance with the pressure of the polymeric material at a predetermined point within the extruder to maintain the increased pressure within predetermined limits.

8. Apparatus as claimed in claim 7, wherein the said point within the extruder is at the transition section of the extruder screw.

9. Apparatus for feeding flake polymeric material to an extruder and for compressing such material to an increased density comprising:
   a. a storage container for receiving the flake material and for feeding it to a crammer device,
   b. a crammer device receiving the flake material from the storage container and feeding it to the extruder, the crammer device including a rotatable screw member inside an enclosure therefor and a motor driving the crammer screw member,
   c. an extruder receiving the crammed polymeric material and feeding it in a flow path therein,
   d. a pressure detector measuring the pressure of the polymeric material at a point along the said flow path within the extruder and producing a signal in response thereto, and
   e. means controlling the motor in response to the said signal to maintain the measured pressure within predetermined limits.

10. Apparatus as claimed in claim 9, wherein the compression ratio of the crammer is between 1.3:1 and 3.0:1.

11. Apparatus as claimed in claim 9, wherein the pressure detector measures the pressure of the polymeric material at the transition section of the extruder screw.

* * * * *